No. 746,286. PATENTED DEC. 8, 1903.
J. W. CARLETON.
PLANE IRON.
APPLICATION FILED SEPT. 19, 1903.
NO MODEL.
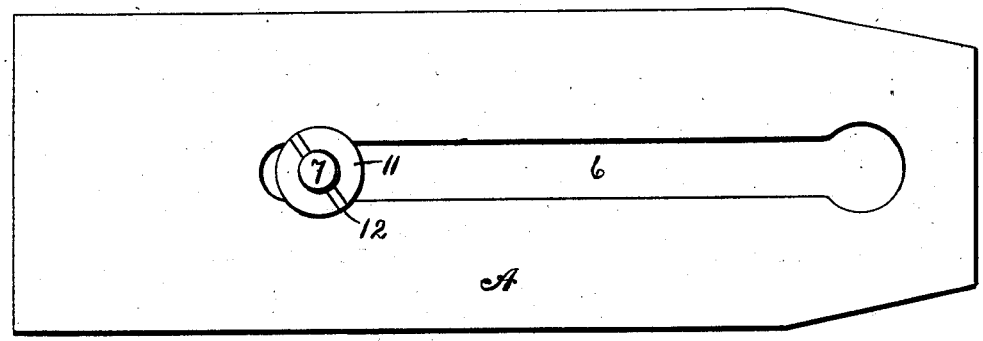
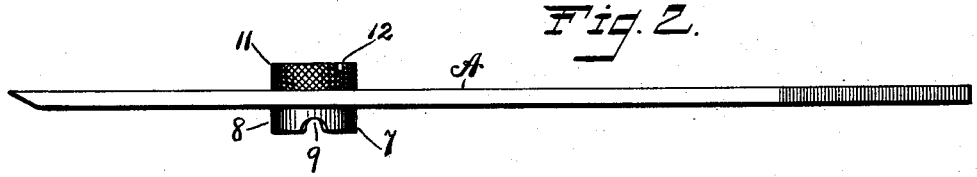
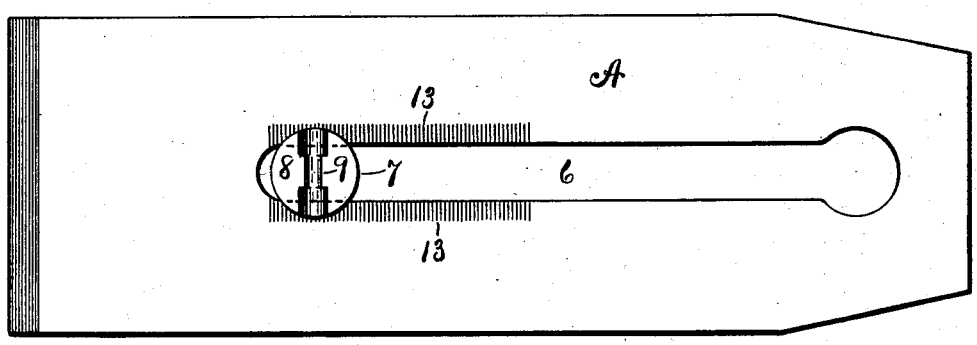
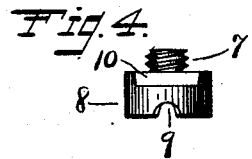
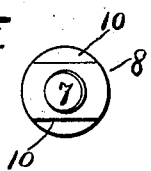
Witnesses.
S. H. Clarke.
P. J. Egan.
Inventor.
John W. Carleton.
By James Shepard.
Atty.

No. 746,286.                                Patented December 8, 1903.

UNITED STATES PATENT OFFICE.

JOHN W. CARLETON, OF NEW BRITAIN, CONNECTICUT, ASSIGNOR TO UNION MANUFACTURING COMPANY, OF NEW BRITAIN, CONNECTICUT, A CORPORATION OF CONNECTICUT.

PLANE-IRON.

SPECIFICATION forming part of Letters Patent No. 746,286, dated December 8, 1903.

Application filed September 19, 1903. Serial No. 173,821. (No model.)

*To all whom it may concern:*

Be it known that I, JOHN W. CARLETON, a citizen of the United States, residing at New Britain, in the county of Hartford and State of Connecticut, have invented certain new and useful Improvements in Plane-Irons, of which the following is a specification.

My invention relates to improvements in plane irons or cutters; and the object of my improvement is to facilitate securing the bit-adjusting bolt to the body of the cutting-bit or plane-iron.

In the accompanying drawings, Figure 1 is a plan view of my plane-iron. Fig. 2 is a side elevation of the same. Fig. 3 is a reverse plan view of the same. Fig. 4 is a detached side elevation of the adjusting-bolt with the nut removed. Fig. 5 is a plan view of the same.

A designates the cutting-bit, having the usual longitudinal slot 6, within the lower end of which is the bolt 7, by which to connect the said cutting-bit with any ordinary devices for adjusting the said bit longitudinally. This bolt has its head 8 projecting from the under side of the bit and is provided with a slot 9 to receive a projection of the lever or other device for adjusting the bit longitudinally. A portion of the head is slabbed off on opposite sides, as at 10, Figs. 4 and 5, to let the said bolt-head into the slot 6 of the bit, with the said slabbed-off portions acting in connection with the sides of the slot to prevent the said bolt from rotating within the said slot. The end or body of the bolt 7 is screw-threaded and receives a nut 11, which rests upon smooth surfaces on the upper broad side of the cutting-bit or plane-iron and by which nut the said bolt may be adjustably secured at any desired position in the lower end of the said slot. This nut is provided with a screw-driver slot 12 to facilitate securing it in place. As shown, the periphery of the said nut is also provided with a knurled surface to facilitate turning the nut with one's fingers.

Upon each side of the slot 6, from its lower end upwardly a part of the length of the said slot, there is formed a roughened face 13, Fig. 3, which may be simply a series of alternate fine grooves and ridges extending from the edges of the slot 6 outwardly about the same distance that the bolt-head 8 projects beyond the said edges. These roughened surfaces come under the non-rotating head of the bolt, which is drawn firmly against them by tightening up the nut. This nut bears on smooth surfaces, so that it turns smoothly when it is rotated to draw the bolt-head against the roughened surfaces on the opposite broad side of the cutting-bit, whereby the bolt can be readily and firmly secured in its adjusted position without applying excessive power to the nut. This bolt is designed to be set in the proper position to connect with the longitudinally-adjusting devices when the lower end of the cutting-bit is within its proper range of movement relatively to the throat of the plane-stock. When the cutting-bit is shortened up by wear and repeated grinding, so as not to have the proper range of movement relatively to the throat, the bolt can be readjusted accordingly.

I claim as my invention—

The herein-described cutting-bit having the central longitudinal slot with adjacent smooth surfaces on one broad side of the said bit, and roughened surfaces adjacent to the said slot on the opposite broad side of the said bit and the non-rotating bolt fitted to the said slot and provided with means for being connected with the longitudinally-adjusting devices for the said bit, the said bolt being arranged in the said slot with its head bearing on the said roughened surfaces on one broad side of the said bit and the nut bearing on the opposite broad side of the said bit.

JOHN W. CARLETON.

Witnesses:
JAMES SHEPARD,
SHEFFIELD H. CLARKE.